April 21, 1959 M. W. AXMAN 2,883,590
ELECTROMAGNETIC STRUCTURES
Filed Sept. 2, 1953 2 Sheets-Sheet 1

WITNESSES:
E. A. McCloskey
David M. Schiller

INVENTOR
Max W. Axman.
BY C. L. Freedman
ATTORNEY

April 21, 1959     M. W. AXMAN     2,883,590
ELECTROMAGNETIC STRUCTURES

Filed Sept. 2, 1953     2 Sheets-Sheet 2

WITNESSES:
E.A. M<sup>c</sup>Closkey
David M. Schiller

INVENTOR
Max W. Axman.
BY
ATTORNEY

United States Patent Office 2,883,590
Patented Apr. 21, 1959

2,883,590
ELECTROMAGNETIC STRUCTURES

Max W. Axman, Stirling, N.J., assignor to Westinghouse Electric Corporation, East Pittsburgh, Pa., a corporation of Pennsylvania Application September 2, 1953, Serial No. 378,148

13 Claims. (Cl. 317—180)

This invention relates to electromagnetic structures and particularly to electromagnetic structures for alternating-current watthour meters.

According to the invention a magnetic structure includes a plurality of parts which are adjustable to provide a contractible and expansible magnetic structure. The parts are configured and arranged to provide a magnetic structure which may be proportioned by adjustment of the magnetic parts to facilitate the application and removal of winding means relative thereto.

In a preferred embodiment of the invention, the magnetic structure is utilized as the current magnetic structure of a watthour meter. The structure is assembled from a plurality of magnetic laminations each having a symmetrical periphery with a pair of extensions projecting therefrom along a pair of parallel axes spaced unequal distances from the axis of symmetry of the periphery to provide portions of a pair of current poles. Each extension is provided with a projection with the projections extending from corresponding sides of the extensions of each lamination and being of different configuration.

In order to facilitate the application and removal of winding means relative to the magnetic structure, the laminations are arranged in stacked relation with certain laminations reversed relative to the others about the axes of symmetry of the peripheries thereof. The laminations are then adjusted to provide a pair of composite extensions proportioned to receive winding means which conveniently may be in the form of a preformed coil assembly. By adjusting the laminations to align the peripheries thereof, the coil assembly is secured against displacement to provide a rigid electromagnetic structure.

The projections of the extensions provide first and second pairs of projections of the pole pieces. Conveniently, the first projections may be utilized to support a magnetic shunt member. The second projections provide a desired configuration of the pole faces of the pole pieces and, in addition, may conveniently be employed to assist in securing the coil assembly in operative position.

It is, therefore, an object of the invention to provide an improved electromagnetic structure.

It is another object of the invention to provide an improved expansible electromagnetic structure for an alternating-current watthour meter.

It is a further object of the invention to provide a magnetic structure having a plurality of adjustable parts configured and arranged to permit the application and removal of winding means relative thereto upon adjustment of such parts.

It is still another object of the invention to provide a current electromagnetic structure for watthour meters including a magnetic structure constructed of a plurality of laminations each having a symmetrical periphery and a pair of extensions projecting therefrom along a pair of axes parallel to and spaced unequal distances from the axis of symmetry of the periphery thereof to provide a pair of spaced current poles, certain laminations being reversed relative to the other laminations about the axes of symmetry of the peripheral portions thereof.

It is another object of the invention to provide an improved magnetic lamination.

It is a further object of the invention to provide an improved method of assembling an electromagnetic structure.

Other objects of the invention will become apparent from the following detailed description taken in conjunction with the accompanying drawings in which.

Figure 1:
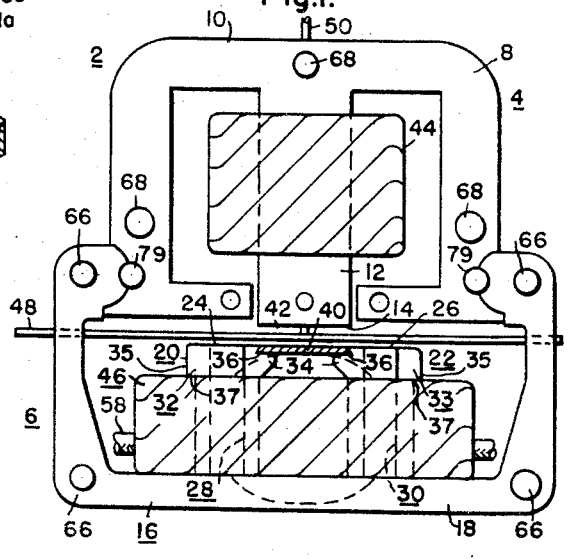
Figure 1 is a view in front elevation of an integrating watthour meter embodying the invention.

Referring to the drawings, there is shown in Fig. 1 an instrument 2 which may be in the form of an integrating watthour meter suitable for measuring energy of an alternating-current circuit and having a voltage electromagnetic structure 4 and a current electromagnetic structure 6. The structure 4 includes a magnetic structure preferably assembled from a plurality of laminations 8 of suitable magnetic material, such as magnetically soft steel, disposed in stacked relation to provide a peripheral portion 10 and a voltage magnetic pole 12 having a pole face 14. The structure 6 includes a magnetic structure comprising a plurality of magnetic parts preferably in the form of laminations 16 disposed in stacked relation, as described more fully hereinafter, to provide a peripheral portion 18 and a pair of spaced composite pole pieces 20 and 22 having pole faces 24 and 26 respectively. The pole pieces 20 and 22 include respectively shank portions 28 and 30 and terminal portions 32 and 33 with the terminal portions each having projecting portions 34 and 35. As illustrated, the pole faces 24 and 26 of the poles 20 and 22 may be cut away at opposed areas to provide table portions 36 proportioned to receive a magnetic shunt member 40 for improving the registration curve of the instrument 2 at heavy loads. The pole faces 24 and 26 of the current poles 20 and 22 are disposed in a common plane which is substantially parallel to and spaced from the plane defined by the pole face 14 of the voltage pole 12 to provide an air gap 42.

In order to produce a shifting magnetic field within the air gap 42 the voltage pole 12 is provided with a coil assembly 44 and the pair of spaced current poles 20 and 22 are provided with a coil assembly 46. The coil 44 is adapted to be connected for energization in accordance with voltage of an alternating-current circuit (not shown) whereas the coil 46 is adapted to be connected for energization in accordance with current of an alternating-current circuit (not shown). With connections properly made the coils 44 and 46 are effective when energized to produce a shifting magnetic field within the air gap 42 as is well understood in the art.

In order to produce a response representative of energy of an alternating-current circuit (not shown), an electroconductive armature 48 is mounted for rotation through the air gap 42 under the influence of the shifting magnetic field produced by energization of the coils 44 and 46. The armature 48 may conveniently be in the form of an aluminum disc mounted for rotation on a shaft 50 as is understood in the art.

Figure 2:
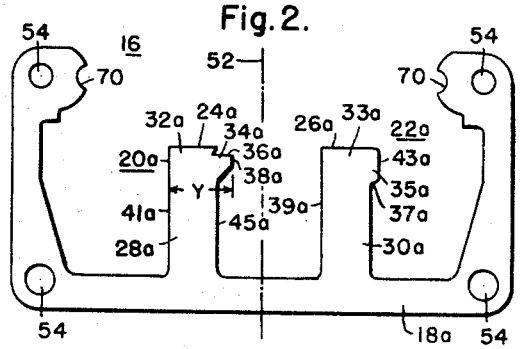
Fig. 2 is a view in front elevation of a magnetic lamination employed in the meter of Fig. 1.

As described hereinbefore, the electromagnetic structure 6 includes a magnetic structure assembled from a plurality of magnetic laminations 16. One of the laminations 16 is illustrated in Fig. 2. As there shown, the lamination 16 is provided with a symmetrical peripheral portion 18a having two extensions 20a and 22a projecting therefrom along a pair of central axes which are parallel to and spaced unequal distances from the axis of symmetry 52 of the periphery 18a. The extension 20a and 22a include respectively shank portions 28a and 30a and terminal portions 32a and 33a having projections 34a and 35a of different length and configuration extending from corresponding sides thereof. By inspection of Fig. 2 it will be observed that the shank portions 28a and 30a of the extensions 20a and 22a have substantially equal width and length dimensions with the sides 45a and 39a thereof being spaced unequal distances from the axis of symmetry 52. Such difference in spacing should be small enough to provide overlapping of the cooperating extensions of each of the pole pieces 20 and 22 when the laminations are in the reversed condition as explained hereinafter. The length or distance of extension of the projection 34a and beyond the shank portion 28a is somewhat greater than the length or distance of extension of the projection 35a beyond the shank portion 30a. In order to support the magnetic member 40, the projection 34a is provided with a side 36a defining a ledge. The side 37a of the projection 35a is preferably spaced from the peripheral portion 18a by a predetermined distance for a purpose appearing hereinafter. The lamination 16 may be provided with a plurality of openings 54.

Figure 4:
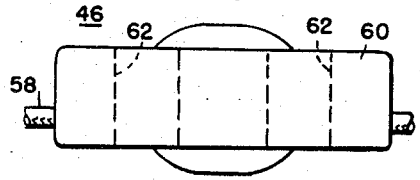
Fig. 4 is a view in front elevation of a preformed coil assembly utilized in the meter of Fig. 1.
Figure 5:
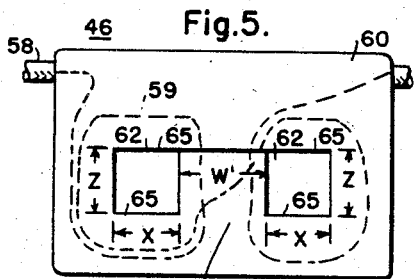
Fig. 5 is a view in top plan of the coil assembly of Fig. 4.

With reference to Figs. 4 and 5, there is shown a coil assembly 46 referred to hereinbefore as being associated with the current electromagnetic structure 6. The assembly 46 may include a conductor 58 wound as indicated by the dotted line 59 in Fig. 5 to provide two coils connected in series and poled in opposition to produce when energized aiding magnetomotive forces directing magnetic flux in series through a magnetic path including the current poles 20 and 22. The coils preferably are imbedded within a suitable plastic mass 60 of a heat hardenable resinous composition such as a polyester. The assembly 46 is of substantially figure-of-eight configuration having a pair of openings 62 separated by a bridge portion 64. Dimensions of the openings 62 are selected to permit proper positioning of the assembly 46 relative to the extensions 20a and 22a of a stack of the laminations 16. In a preferred embodiment of the invention, dimensions of the openings 62 represented by the letter X in Fig. 5 are selected to be slightly greater than the widths of the shank portions 28a and 30a of the extensions plus the difference in spacing of the sides 45a and 39a from the axis 52. With such construction the coil 46 may be positioned relative to the pole pieces 20 and 22 with sides of the pole pieces engaging side walls of the coil openings 62 thereby preventing lateral displacement of the coil assembly. The thickness of a stack of laminations 16 will determine minimum dimensions of the openings 62 represented by the letter Z in Fig. 5. In order to provide a rigid structure it is desirable that the openings 62 be of rectangular cross-section with the dimensions Z selected so that the walls 65 of the openings 62 engage the extensions 20a and 22a of the end lamination of a stack. As will appear hereinafter, spacing of the openings 62 will depend upon the particular adjustment of the laminations selected to prepare the composite extensions for reception of the coil assembly 46. Operations required to assemble the current structure 6 may now be described.

Figure 3:
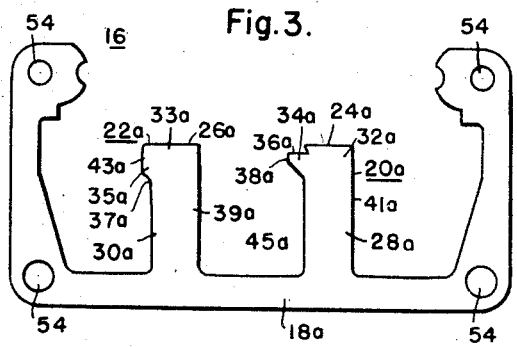
Fig. 3 illustrates the lamination of Fig. 2 reversed 180° about the axis of symmetry of the peripheral portion thereof.

A plurality of the laminations 16 are initially arranged in stacked relation with certain laminations reversed relative to the other laminations about the axes of symmetry 52 of the peripheral portions thereof. By such arrangement, the extensions 22a and 20a of the reversed laminations cooperate respectively with the extensions 20a and 22a of the other laminations to provide a pair of composite extensions. Fig. 3 illustrates one of the laminations 16 reversed 180° about the axis of symmetry 52 of the peripheral portion 18a thereof. In order to provide a rigid magnetic structure 6, it is preferable that alternate laminations of the stack be reversed in the manner described. However, satisfactory results may also be realized by reversing different numbers of laminations such as every third lamination of the stack.

Hereinafter, laminations disposed as shown in Fig. 2 will be referred to as first laminations, and laminations disposed as shown in Fig. 3 will be referred to as second laminations.

Figure 6:
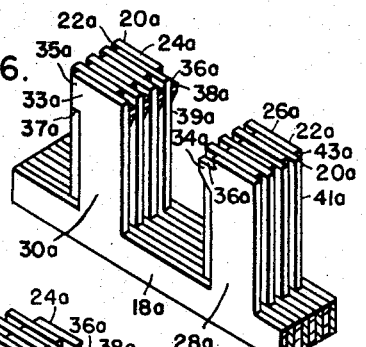
Fig. 6 is a view in perspective with parts broken away of a plurality of laminations of the type shown in Fig. 2 arranged to receive the coil assembly of Fig. 4.
Figure 8:
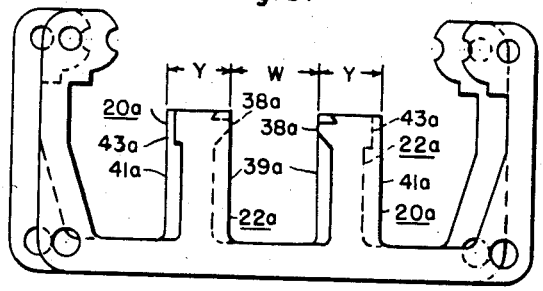
Figs. 8, 9 and 10 are views in front elevation of a plurality of laminations of the type shown in Fig. 2 showing different arrangements of the laminations permitting application of coil assemblies of different dimensions.

In order to permit the application of a coil assembly, such as the coil assembly 46, to the pair of composite extensions of the stack, the laminations of the stack are adjusted to provide a pair of composite extensions having maximum width dimensions which are less than the dimensions X of the coil openings 62. As shown in Fig. 2 the dimension Y is selected to be equal to the width of the shank portions 28 and 30 of the pole pieces and is, therefore, slightly less than the dimensions X. Consequently, by adjusting the laminations to provide composite extensions of maximum width dimension equal to the dimension Y, the coil 46 may be readily positioned about the composite extensions. The desired dimensions of the composite extensions may be obtained by a number of adjustments of the laminations. For example, the laminations of the stack may be adjusted relative to one another to effect substantial alignment between the tips 38a of the extensions 20a of the first laminations and the sides 39a of the extension 22a of the second laminations which are reversed relative to the first laminations. Figs. 6 and 8 illustrate the relative positions assumed by the extensions 20a and 22a after such adjustment has been effected. By inspection of Fig. 8, it will be observed that adjustment of the laminations in the manner described provides a pair of composite extensions each having a maximum width dimension substantially equivalent to the dimension Y of the extensions 20a.

As shown in Fig. 8, the aligned tips and sides of one composite extension are spaced from the aligned tips and sides of the other composite extension by a distance represented by the letter W. Consequently, the openings 62 of the coil assembly 46 are preferably spaced by a distance which is slightly less than the distance W in order to permit application of the coil assembly to composite extensions spaced as shown in Fig. 8.

Figure 9:
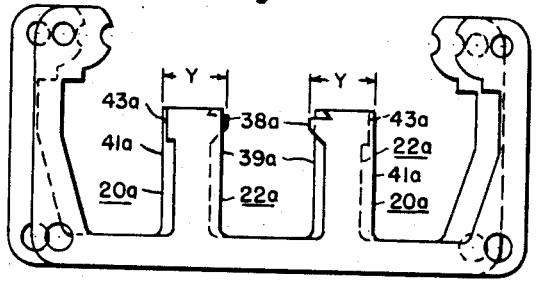
Figure 10:
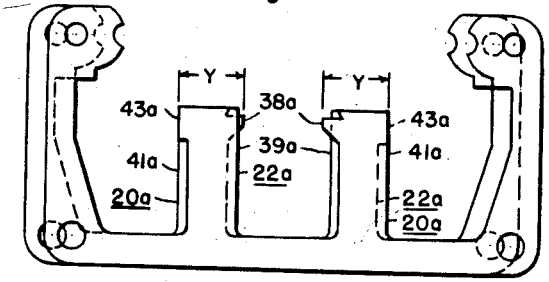

Maximum width dimensions Y of the composite extensions may also be obtained by effecting various other adjustments of the laminations. For example, the laminations may be adjusted relative to one another to effect substantial alignment between the sides 41a of the extensions 20a of the first laminations and the sides 43a of the extensions 22a of the second laminations as is shown in Fig. 10. In addition, composite extensions having maximum width dimensions equivalent to the dimension Y may be provided by adjusting the laminations to have the extensions thereof positioned as shown in Fig. 9. By inspection of Fig. 9, it will be observed that the sides 41a and the tips 38a of the extensions 20a of the first laminations project slightly beyond the sides 43a and 39a of the extensions 22a of the second laminations whereby the sides 41a and the tips 38a determine the maximum width dimensions of the composite extensions.

It is noted that other slight adjustments of the laminations may be effected to provide composite extensions having maximum width dimensions defined by the sides 41a and the tips 38a of the extensions 20a.

With reference to Fig. 5, the coil assembly 46 is illustrated as having openings 62 spaced by a distance represented by the letter W'. As described previously, the dimension W' is slightly less than the spacing W of the composite extensions of Fig. 8 to permit application of the assembly 46 to the extensions. However, coil assemblies having openings of width dimensions X but with the openings spaced by distances other than the distance W' may also be applied to the composite extensions of the stack of laminations 16. As described hereinbefore, Figs. 8, 9 and 10 illustrate the stacked laminations in three different positions of adjustment effective in each case to provide a pair of composite extensions each having a maximum width dimension equal to the dimension Y of the extensions 20a. It will be observed, however, that in each case the spacing between the composite extensions is different. For example, in Fig. 10, it is observed that the aligned tips 38a of the first laminations are spaced from the aligned tips 38a of the second laminations by a predetermined distance. By effecting movement of the second laminations in the direction represented by the arrow 69 of Fig. 10 to the position shown in Fig. 9, the spacing of the aligned tips 38a of the first laminations and the aligned tips 38a of the second laminations is slightly increased. Continued movement of the second laminations in the same direction to the position shown in Fig. 8 is effective to further increase the spacing of the pairs of aligned tips 38a. It is noticed that the same results may be obtained by effecting movement of the first laminations in the direction opposite from the direction represented by the arrow 69. Figs. 8 and 10 illustrate respectively composite extensions spaced by the minimum and maximum distances which permit application of a coil assembly thereto having openings of width dimensions X. By means of the various adjustments of the laminations 16 as just described, the spacing between the composite extensions may be varied between certain limits without altering the maximum width dimensions of the extensions. Consequently, the composite extensions may be adapted by simple adjustment of the laminations to receive separately a number of coil assemblies having extension-receiving openings of equal width dimensions but with the openings spaced by different distances. By inspection of Figs. 8, 9 and 10, it will be observed that spacings of the extension-receiving openings may vary by an amount substantially equal to the difference between the maximum width dimensions of the extensions 20a and 22a.

In order to apply a coil assembly, such as the assembly 46, to the composite extensions the coil assembly is positioned with each opening thereof substantially in vertical alignment with a separate composite extension whereby the assembly may be passed over the extensions to assume the position in which it engages the peripheral portion 18 of the structure 6 and surrounds the shank portions of the composite extension.

Figure 7:
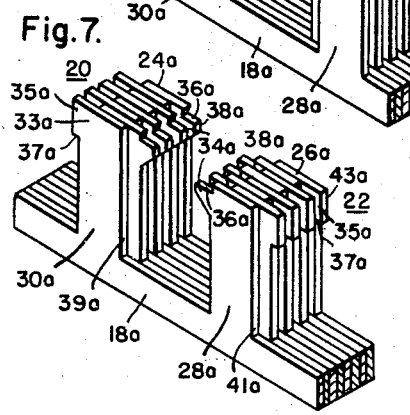
Fig. 7 is a view in perspective with parts broken away of a plurality of laminations of the type shown in Fig. 2 arranged after final assembly thereof.

In order to secure the coil assembly against displacement and to provide the desired configuration of the pole faces of the current pole pieces, the laminations of the stack may now be adjusted relative to one another along an axis substantially transverse to the axes of symmetry of the peripheral portions of the laminations to effect substantial alignment of the peripheral portions. The thickness of the coil assembly should be such that adjustment of the laminations 16 in the maner just described operates to bring the sides 37a of the projections 35a into engagement with external surfaces of the assembly 46 as is shown at 37 in Fig. 1. To unite the laminations 16 suitable securing means such as rivets or bolts 66 may be inserted through the aligned openings 54 of the laminations 16 to provide a rigid electromagnetic structure 6. The laminations 8 of the structure 4 may be united in a similar manner as by rivets or bolts 68. In order to secure the assembled structures 4 and 6 together to provide the complete magnetic structure of the meter 2, the laminations 16 are provided with notches 70 configured to cooperate with notches of the laminations 8 to define openings for receiving suitable rivets or other fastening means 79. Upon final assembly of the laminations 16 to provide the structure 6, the extensions 20a and 22a thereof assume positions relative to one another as illustrated in Figs. 1 and 7.

By providing a magnetic structure of two part construction, and by constructing the current part thereof in accordance with teachings of the invention, the coil assembly 46 may be readily removed from the current part for salvage. The current and voltage parts may be separated by removing the rivets 79. Upon removal of the rivets 66 of the current part, the laminations thereof may be adjusted to permit removal of the coil assembly from the composite extensions.

Although I have shown and described specific embodiments of the invention, I am aware that other modifications thereof are possible. My invention, therefore, is not to be restricted except insofar as is necessitated by the prior art and the spirit of the invention.

I claim as my invention:

1. An electromagnetic structure including a magnetic structure having a magnetic pole assembled from a plurality of magnetic laminations disposed in stacked relation, each lamination having an extension with side edges defining a first width dimension of the extension, said extension projecting along a first axis to provide a portion of said magnetic pole, and a winding surrounding the magnetic pole having an opening with a second width dimension greater than the first width dimension, said laminations being slidable relative to one another along second axes extending transverse to said first axes from a first position wherein the side edges of the extensions are spaced from the walls of said opening to a second position wherein side edges of the extensions engage walls of said opening.

2. In an alternating-current device, a magnetic structure defining an air-gap, winding means for said magnetic structure effective to produce when energized a shifting magnetic field in said air-gap, and translating means positioned within said air-gap responsive to said shifting magnetic field, said winding means including a coil assembly having an opening through which projects a portion of said magnetic structure, said magnetic structure having a plurality of parts adjustable in directions parallel to the plane of the magnetic structure, said parts being adjustable relative to the coil assembly from a first position wherein said parts are spaced from said coil assembly to a second position wherein said parts engage said coil assembly.

3. In a watthour meter, a voltage magnetic structure including a voltage pole having a first pole face, a current magnetic structure including a pair of current poles having second pole faces, said second pole faces being disposed in a common plane spaced from the plane of the first pole face to define an air-gap, a voltage winding for said voltage pole, a current winding for said current poles, said windings being effective to produce when energized a shifting magnetic field within the air-gap, and translating means responsive to said shifting magnetic field, said current magnetic structure comprising a plurality of magnetic laminations, each lamination having a symmetrical periphery of substantially U-shaped configuration defining an axis of symmetry with a pair of extensions projecting from the base thereof toward the open end thereof to provide portions of said current poles, said extensions projecting along a pair of parallel axes spaced unequal distances from the axis of symmetry of said periphery, certain of said laminations being reversed relative to the remaining laminations about the axes of symmetry thereof.

4. An electromagnetic structure including a magnetic structure assembled from a plurality of laminations disposed in stacked relation, each lamination having a symmetrical periphery defining an axis of symmetry with a pair of extensions having side edges projecting along first axes extending parallel to and spaced unequal distances from the axis of symmetry to provide portions of a pair of poles, certain laminations being reversed relative to the other laminations about the axes of symmetry of the peripheries thereof, and a winding having a pair of openings surrounding said poles with each of said poles projecting into a separate one of the openings, each opening having a width dimension greater than the width dimension defined by the side edges of each extension, said laminations being slidable relative to one another along second axes extending transverse to said first axes from a first position wherein said extensions are disposed within said openings with clearance between the sides of the extensions and walls of the openings to a second position wherein the extensions are disposed within the openings with sides of the extensions engaging walls of the openings.

5. A current magnetic structure for an alternating-current watthour meter, said structure comprising a plurality of magnetic laminations disposed in stacked relation, each lamination having a symmetrical periphery of substantially U-shaped configuration defining an axis of symmetry with a pair of extensions projecting from the base thereof toward the open end thereof, the extensions of each lamination projecting along axes extending parallel to and spaced unequal distances from the axis of symmetry of the periphery thereof to provide portions of a pair of current magnetic poles, certain laminations being reversed relative to the other laminations about the axes of symmetry of the peripheries thereof.

6. The method of assembling an electromagnetic structure comprising the steps of forming a plurality of magnetic laminations each having a symmetrical periphery defininig an axis of symmetry with a pair of extensions projecting along axes on opposite sides of the axis of symmetry extending parallel to and spaced unequal distances from the axis of symmetry, each extension being formed with a projection with the projections of the extensions of each lamination extending from corresponding side edges of such extensions, arranging the laminations in stacked relation with the projections extending in a common direction, reversing certain laminations relative to the other laminations about the axes of symmetry of the peripheries thereof, effecting relative sliding movement between the laminations along first axes extending transverse to the axes of symmetry to provide a pair of composite extensions of the stack of minimum width dimensions, forming a coil assembly with a pair of openings spaced and proportioned to receive said pair of composite extensions, positioning said coil assembly around said composite extensions intermediate said projections and said peripheries, effecting relative sliding movement between the laminations along said first axes to simultaneously align the peripheries thereof and position certain of the projections in overlapping engagement with the coil assembly, and uniting said laminations to provide a rigid electromagnetic structure.

7. A magnetic member having a symmetrical periphery of substantially U-shaped configuration defining an axis of symmetry with a pair of extensions projecting from the base thereof toward the open end thereof along axes extending parallel to and spaced unequal distances from the axis of symmetry, each of said extensions having a projection with the projections extending from corresponding side edges of said extensions in the planes thereof.

8. An electromagnetic structure including a magnetic structure comprising a plurality of laminations, each of said laminations having a symmetrical periphery defining an axis of symmetry with a pair of extensions projecting along first axes extending parallel to and spaced unequal distances from the axis of symmetry to provide portions of a pair of magnetic poles of the structure, each extension having a projection with the projections extending from corresponding side edges of the extensions of each lamination, said extensions and projections providing respectively shank and terminal sections of the magnetic poles, certain of the laminations being reversed relative to the remaining laminations about the axes of symmetry thereof with the peripheries in alignment to provide a pair of shank sections of width dimensions less than the width dimensions of the associated terminal sections, and a coil assembly having a pair of openings each with a width dimension less than the width dimension of the terminal sections, said coil assembly surrounding the shank sections with each terminal section in overlapping engagement with surfaces of the coil assembly adjacent a separate one of the openings.

9. An electromagnetic structure including a magnetic structure assembled from a plurality of laminations disposed in stacked relation, each lamination having an extension projecting along a first axis extending parallel to and spaced from a second axis to provide a portion of a magnetic pole of the structure, each extension having a projection extending therefrom in the plane thereof, said extensions and projections defining respectively shank and terminal sections of the magnetic pole, certain of said laminations being reversed relative to the remaining laminations about the second axis to provide a magnetic pole having a shank section of a width dimension less than the width dimension of the associated terminal section, and a coil assembly having an opening with a width dimension less than the width dimension of the terminal section, said coil assembly surrounding the shank section with the terminal section in overlapping engagement with a surface of the coil assembly adjacent said opening.

10. In a watthour meter a voltage magnetic structure including a voltage pole having a first pole face, a current magnetic structure including a pair of spaced current poles having second pole faces, said second pole faces being disposed in a common plane spaced from the plane of the first pole face to define an air gap, voltage and current winding means for the voltage and current poles effective when energized to produce a shifting magnetic field in the air gap, translating means mounted for movement through the air gap under the influence of the magnetic field, said current structure comprising a plurality of laminations each having a symmetrical periphery defining an axis of symmetry with a pair of eytensions projecting therefrom along first axes extending parallel to and spaced unequal distances from the axis of symmetry to provide portions of the current poles, each extension having a projection with the projections extending from corresponding side edges of the extensions of each lamination, certain of the laminations being reversed relative to the remaining laminations about the axes of symmetry with the peripheries in alignment to provide first and second composite projections of each current pole extending in opposing directions to define terminal sections of said current poles, said extensions defining a pair of shank sections of the current poles each having a width dimension less than the width dimension of the associated terminal section, and a magnetic shunt member intermediate the current poles supported by said first composite projections, said current winding means comprising a coil assembly having a pair of openings each with a width dimension less than the width dimension of the terminal sections, said coil assembly surrounding the shank sections with each of the second composite projections in overlapping engagement with surfaces of the coil assembly adjacent a separate one of the openings.

11. The method of assembling an electromagnetic structure comprising the steps of forming a plurality of magnetic laminations each having a symmetrical periphery defining an axis of symmetry with a pair of extensions projecting along axes on opposite sides of the axis of symmetry extending parallel to and spaced unequal distances from the axis of symmetry, each extension having a projection extending from a side edge of the associated extension adjacent the free end thereof, said projections extending from corresponding side edges of the extensions in the planes thereof to define therewith first width dimensions, arranging the laminations in stacked relation with certain laminations reversed about the axes of symmetry relative to the remaining laminations, effecting relative sliding movement between the laminations along first axes extending transverse to the axes of symmetry to provide a pair of composite extensions of minimum width dimensions, forming a coil assembly with a pair of openings having second width dimensions substantially equal to said first width dimensions, positioning said coil assembly around the composite extensions intermediate said projecitons and said peripheries, effecting relative sliding movement between the laminations along said first axes to provide a pair of composite extensions of maximum width dimensions with certain of the projections in overlapping engagement with the coil assembly, and uniting the laminations to provide a rigid electromagnetic structure.

12. An electromagnetic structure including a magnetic structure having a plurality of parts adjustable in directions parallel to the plane of the magnetic structure, and a winding for said magnetic structure, said parts being adjustable relative to the winding and relative to one another from a first position wherein said parts are spaced from said winding to permit removal of the winding from the magnetic structure to a second position wherein said parts engage said winding to prevent removal of the winding from the magnetic structure.

13. An electromagnetic structure including a magnetic structure having a magnetic pole with a width dimension extending parallel to the plane of the magnetic structure, and a winding having an opening surrounding the magnetic pole with the pole projecting into said opening, said magnetic pole having a plurality of adjustable parts, said parts being adjustable relative to the winding and relative to one another from a first position wherein said parts are spaced from the winding to define a first width dimension of said pole to a second position wherein said parts engage the winding to define a second width dimension of said pole greater than said first width dimension.

References Cited in the file of this patent
UNITED STATES PATENTS

| | | |
|---|---|---|
| 2,098,070 | Stimson | Nov. 2, 1937 |
| 2,261,323 | Zierdt | Nov. 4, 1941 |
| 2,330,824 | Granfield | Oct. 5, 1943 |
| 2,460,145 | Pfuntner | Jan. 25, 1949 |
| 2,612,681 | Camras | Oct. 7, 1952 |
| 2,656,512 | Lenehan | Oct. 20, 1953 |